US012236268B2

(12) United States Patent
Beyer et al.

(10) Patent No.: US 12,236,268 B2
(45) Date of Patent: *Feb. 25, 2025

(54) DISTRIBUTED JOB SCHEDULING SYSTEM

(71) Applicant: Google LLC, Mountain View, CA (US)

(72) Inventors: Ilya Beyer, Mill Valley, CA (US); Ievgen Ignatiev, Kyiv (UA); Maksym Skrynnik, Kyiv (UA)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/452,571

(22) Filed: Oct. 27, 2021

(65) Prior Publication Data

US 2022/0050713 A1 Feb. 17, 2022

Related U.S. Application Data

(63) Continuation of application No. 16/137,921, filed on Sep. 21, 2018, now Pat. No. 11,182,209.

(51) Int. Cl.
  *G06F 9/48* (2006.01)
  *G06F 9/50* (2006.01)
  *H04L 67/104* (2022.01)

(52) U.S. Cl.
  CPC .......... *G06F 9/4887* (2013.01); *G06F 9/5038* (2013.01); *G06F 9/5072* (2013.01); *H04L 67/1044* (2013.01)

(58) Field of Classification Search
  None
  See application file for complete search history.

(56) References Cited

U.S. PATENT DOCUMENTS

| | | | | |
|---|---|---|---|---|
| 8,863,096 | B1* | 10/2014 | Bucur | G06F 11/3604 717/124 |
| 9,600,216 | B2* | 3/2017 | Ly | G06F 3/1288 |
| 10,745,544 | B2* | 8/2020 | Sugihara | F16L 11/08 |
| 2005/0071842 | A1* | 3/2005 | Shastry | G06F 9/5038 718/100 |
| 2005/0081097 | A1* | 4/2005 | Bacher | G06F 11/2097 714/13 |
| 2008/0209423 | A1* | 8/2008 | Hirai | G06F 9/5027 718/102 |
| 2008/0294937 | A1* | 11/2008 | Ueda | G06F 9/4856 714/15 |
| 2008/0307258 | A1 | 12/2008 | Challenger et al. | |
| 2009/0168092 | A1 | 7/2009 | Chen et al. | |
| 2009/0187619 | A1* | 7/2009 | Shigeta | G06Q 10/06 709/201 |

(Continued)

*Primary Examiner* — Charles E Anya
(74) *Attorney, Agent, or Firm* — Honigman LLP; Brett A. Krueger

(57) ABSTRACT

A method includes receiving a request to perform a job from a second computing device, where the job includes one or more steps to be completed in a period, and where the request includes a job description for the job, storing the job description into a data store, retrieving a step description corresponding to one of the steps of the job to be performed from the data store, where each of the steps is performed by a corresponding worker system, sending the commands to the communication endpoint for the corresponding worker system, receiving a status update comprising results for the commands from the corresponding worker system, and storing the status update to the data store.

20 Claims, 7 Drawing Sheets

(56) References Cited

U.S. PATENT DOCUMENTS

| | | | |
|---|---|---|---|
| 2011/0119604 A1* | 5/2011 | Lo | G06Q 10/06 715/762 |
| 2011/0154350 A1* | 6/2011 | Doyle | G06F 9/5072 718/104 |
| 2011/0191779 A1 | 8/2011 | Ujibashi et al. | |
| 2011/0246823 A1 | 10/2011 | Khan et al. | |
| 2012/0110591 A1 | 5/2012 | Ghosh et al. | |
| 2013/0080824 A1 | 3/2013 | Barsness et al. | |
| 2014/0215481 A1* | 7/2014 | Piet | G06F 11/2041 718/104 |
| 2014/0259018 A1* | 9/2014 | Jain | G06F 9/4881 718/102 |
| 2015/0067019 A1* | 3/2015 | Balko | G06F 9/5038 709/202 |
| 2015/0134695 A1* | 5/2015 | Zhao | G06F 16/25 707/769 |
| 2015/0150016 A1 | 5/2015 | Kim | |
| 2015/0355948 A1* | 12/2015 | Bass | G06F 9/5027 718/104 |
| 2016/0098292 A1* | 4/2016 | Boutin | G06F 9/4881 718/104 |
| 2016/0124978 A1 | 5/2016 | Nithrakashyap et al. | |
| 2016/0197863 A1 | 7/2016 | Wolf et al. | |
| 2017/0364388 A1 | 12/2017 | Sevigny | |
| 2018/0232255 A1 | 8/2018 | Nordin | |
| 2018/0262385 A1 | 9/2018 | Hinni et al. | |
| 2018/0314732 A1* | 11/2018 | Armbrust | G06F 16/24568 |
| 2019/0108057 A1* | 4/2019 | Wong | G06F 9/45529 |
| 2019/0391845 A1* | 12/2019 | Gasser | G06F 9/4887 |
| 2020/0026624 A1* | 1/2020 | Parthasarathy | G06F 11/2025 |

\* cited by examiner

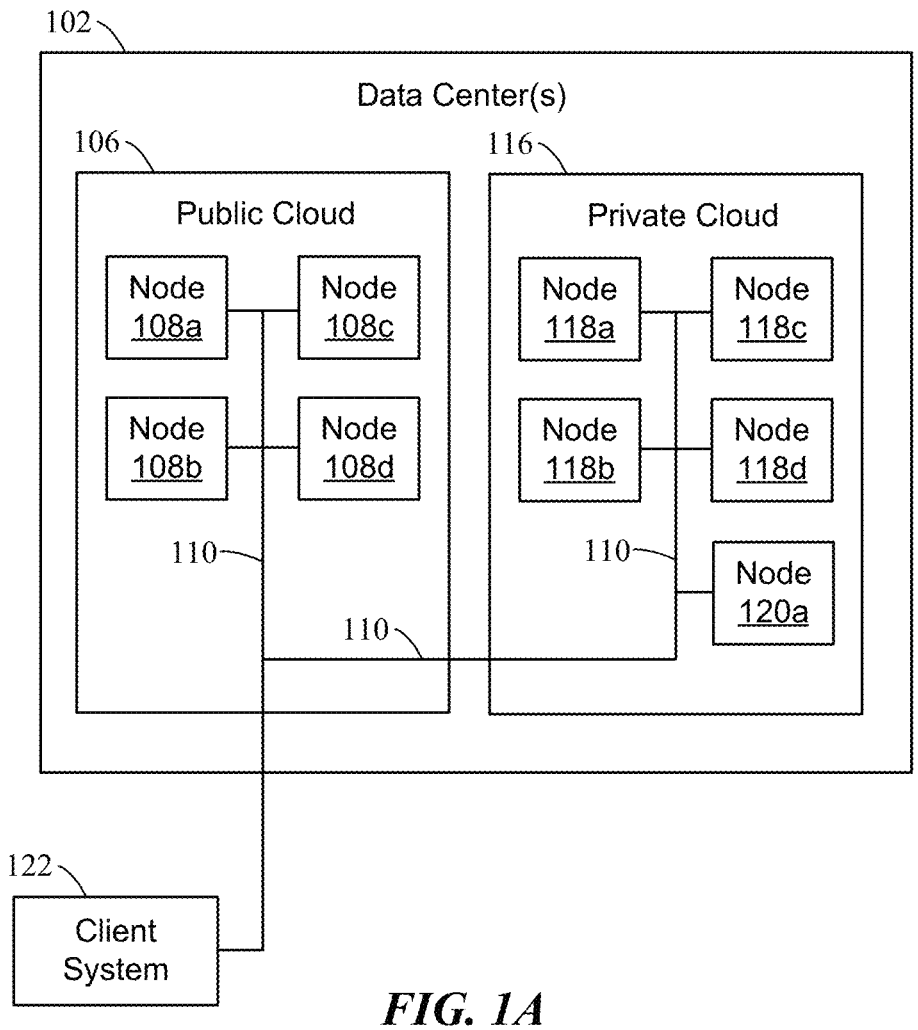

```
- api_version: "jd/v1"
  type: "jobDescription"
  name: "private-cloud-provisioning"
  description: "PC provisioning job description"
  frequency: "OneTime"
  schedule: "* * * * *"
  timeout: 10m
  steps:
```

[Step Description 1]

[Step Description 2]

[Step Description 3]

...

[Step Description k]

```
- name: "hosts_connectivity_data"                              # required
  description: "Prepare hosts connectivity data"               # optional
  timeout: 60s                                                 # optional
  retries: 0                                                   # optional, default is 0
  worker_address: "resource-init-manager"                      # required
  worker_port: 80                                              # required
  worker_step_uri: "/api/v1/provision/djs-job-step/hosts-connectivity-data"
  sleep: 10s                                                   #optional
```

DISTRIBUTED JOB SCHEDULING SYSTEM

CROSS REFERENCE TO RELATED APPLICATIONS

This U.S. patent application is a continuation of, and claims priority under 35 U.S.C. § 120 from, U.S. patent application Ser. No. 16/137,921, filed on Sep. 21, 2018. The disclosure of this prior application is considered part of the disclosure of this application and is hereby incorporated by reference in its entirety.

TECHNICAL FIELD

This disclosure relates to distributed job scheduling systems in cloud computing environments.

BACKGROUND

Cloud computing environments may provide access to computing resources such as processors, storage devices, and software as services to client systems via communications networks. Cloud computing environments may provide scalable computing resources, with processor and storage capacity being allocated according to demand and may provide security and privacy to prevent unauthorized access to information. The computing resources may include server computer systems connected via networks, associated data storage devices, and software that implements cloud services, such as infrastructure software for managing cloud resources, and application software that uses cloud resources. Each of the server computer systems may be a node of a network. The cloud's physical resources, such as server computer systems and associated hardware, such as storage devices and network routers, may be located in one or more data centers. A cloud may thus be said to be hosted by one or more data centers.

A cloud computing environment may be categorized as a public cloud or, a private cloud. A public cloud may provide computing resources to the general public via the public Internet (though communications may be encrypted for information privacy). Examples of public clouds include the Microsoft Azure™ cloud computing service provided by Microsoft Corporation, the Amazon Web Services™ cloud computing service provided by Amazon.com Inc., and the Google Cloud Platform™ cloud computing service provided by Google LLC. A private cloud may provide computing resources to only particular users via a private network or the Internet, e.g., to only users who are members of or associated with a particular organization, and may use resources in a data center hosted by, e.g., on the premises of, the particular organization, or resources hosted in a data center at another location, which may be operated by another organization. The public cloud provider's data center(s) may host some or all of the private cloud resources, and the private cloud provider's data center(s) may host some or all of the public cloud resources. As an example, a private cloud may be implemented by a public cloud provider by, for example, creating an Internet-accessible private cloud for which access is restricted to only specific users. As another example, a private cloud may be implemented by an organization using private cloud software on hardware resources (e.g., in a data center) hosted by the organization itself (or by other organization). The VMware Cloud™ private cloud software, for example, may be used to implement a private cloud.

Cloud computing resources such as computer systems may be provisioned, e.g., allocated, to clients according to requests received from the clients. For example, a client may request access to a specified number of servers with a specified amount of storage and specified operating system and application software. Cloud providers may provision the resources accordingly and may use virtualization techniques to create one or more virtual instances of physical resources such as server computer systems. Each virtual instance may appear, to clients, to be substantially the same as the physical resource, but the virtual instances may be used more efficiently by the cloud provider to fulfill client requests. For example, multiple virtual instances of a physical server may be provided to multiple corresponding users at the same time, and each virtual instance may appear, to its user, to be the same as the physical resource. Virtual instances of a physical server may be created and managed by a hypervisor executing on the physical server. An example hypervisor is the VMware ESXi™ hypervisor provided by VMware Inc. Each virtual instance may be referred to as a virtual machine (VM). An operating system may execute in a virtual machine, and application software may execute in the virtual machine using the operating system.

SUMMARY

In particular embodiments, a computing device associated with a distributed job scheduling system may maintain one or more jobs, each job comprising one or more steps, and triggering each of the one or more steps for each job at a time instance specified in job descriptions. A computing device may comprise a job scheduler. A job scheduler associated with a distributed job scheduling system may receive a request to perform a job from a client computing device. The job may comprise one or more steps to be completed in a period. The request may comprise a job description for the job comprising a name of the job, a schedule to perform the job, a timeout, and a step description for each of the one or more steps. In particular embodiments, the distributed job scheduling system may comprise one or more job schedulers. Each of the one or more job schedulers in the distributed job scheduling system may manage one or more jobs. One of the one or more job schedulers may be a leader job scheduler among the one or more job schedulers that may assign the received request to one of the one or more job schedulers. In order to assign the received request to one of the one or more job schedulers, the leader job scheduler may determine workload of each of the one or more job schedulers by querying the workload of each of the one or more job schedulers to the data store. In particular embodiments, the leader job scheduler may select one of the one or more job schedulers based at least on the determined workload. The leader job scheduler may forward the received request to the selected job scheduler. When no leader device exists, the data store may elect a leader device among the one or more job schedulers. The condition that no active leader device exists may occur when a previous leader device crashes. The condition that no active leader device exists may occur when the distributed job scheduling system is initiated.

In particular embodiments, on receiving the request to perform a job, a job scheduler may store the job description into a data store. The job scheduler may create a handler for the received request. The handler may be a process that is responsible for performing the job throughout a lifetime of the job. In particular embodiments, the handler may be a thread that is responsible for performing the job throughout the lifetime of the job. The job scheduler may initiate an execution of the job at a time instance indicated by the schedule if the frequency is once. The job scheduler may initiate executions of the job at an interval indicated by the schedule if the frequency is periodic. The job scheduler may retrieve a step description corresponding to one of the steps of the job to be performed from the data store. The step description may comprise a name of the step, a communication endpoint for a corresponding worker system, and commands to be delivered to the worker system. The communication endpoint may comprise an address and a port number. The commands may comprise the Uniform Resource Identifier (URI). The job scheduler may send the commands to the communication endpoint for the corresponding worker system. A worker system may be agnostic to another worker system. The corresponding worker system may perform the corresponding step on receiving the commands from the job scheduler. The corresponding worker system may send a status update comprising results for the commands. The job scheduler may receive a status update comprising results for the commands from the corresponding worker system. The job scheduler may store the status update to the data store. In particular embodiments, a step may comprise a plurality of iterations. In such cases, the results of the commands may not be terminal state results if the worker system performed a non-terminal iteration of the step. On receiving non-terminal state results, the job scheduler may wait for an amount of time indicated in the step description and send the commands with an increased iteration number to the communication endpoint for the corresponding worker system. For a step comprising a plurality of iterations, the worker system may identify one or more tasks to be done in each iteration of the step by sending a query to a second data store. In particular embodiments, the worker system may identify one or more tasks to be done in each iteration of the step based on configurations.

In particular embodiments, the leader job scheduler may receive a request to terminate the job that is to be performed in the future from the client computing device. The leader job scheduler may determine which one of the one or more job schedulers in the distributed job scheduling system is managing the job to be terminated by sending a query to the data store regarding a job scheduler that is currently managing the job to be terminated. The leader job scheduler may forward the request to the determined job scheduler. The job scheduler managing the job to be terminated may send a request to delete the job to the data store. The job scheduler may eliminate all data associated with the job. On receiving the request to delete the job, the data store may delete the job description for the job and stored status information.

The embodiments disclosed above are only examples, and the scope of this disclosure is not limited to them. Particular embodiments may include all, some, or none of the components, elements, features, functions, operations, or steps of the embodiments disclosed above. Embodiments according to the disclosure are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF DRAWINGS

FIG. 1A illustrates an example Private Cloud as a Service (PCaaS) computing environment.
FIG. 1B illustrates an example server node.
FIG. 1C illustrates an example management server node.
FIG. 3A illustrates an example job description.
FIG. 3B illustrates an example step description.

DETAILED DESCRIPTION

Figure 1D:
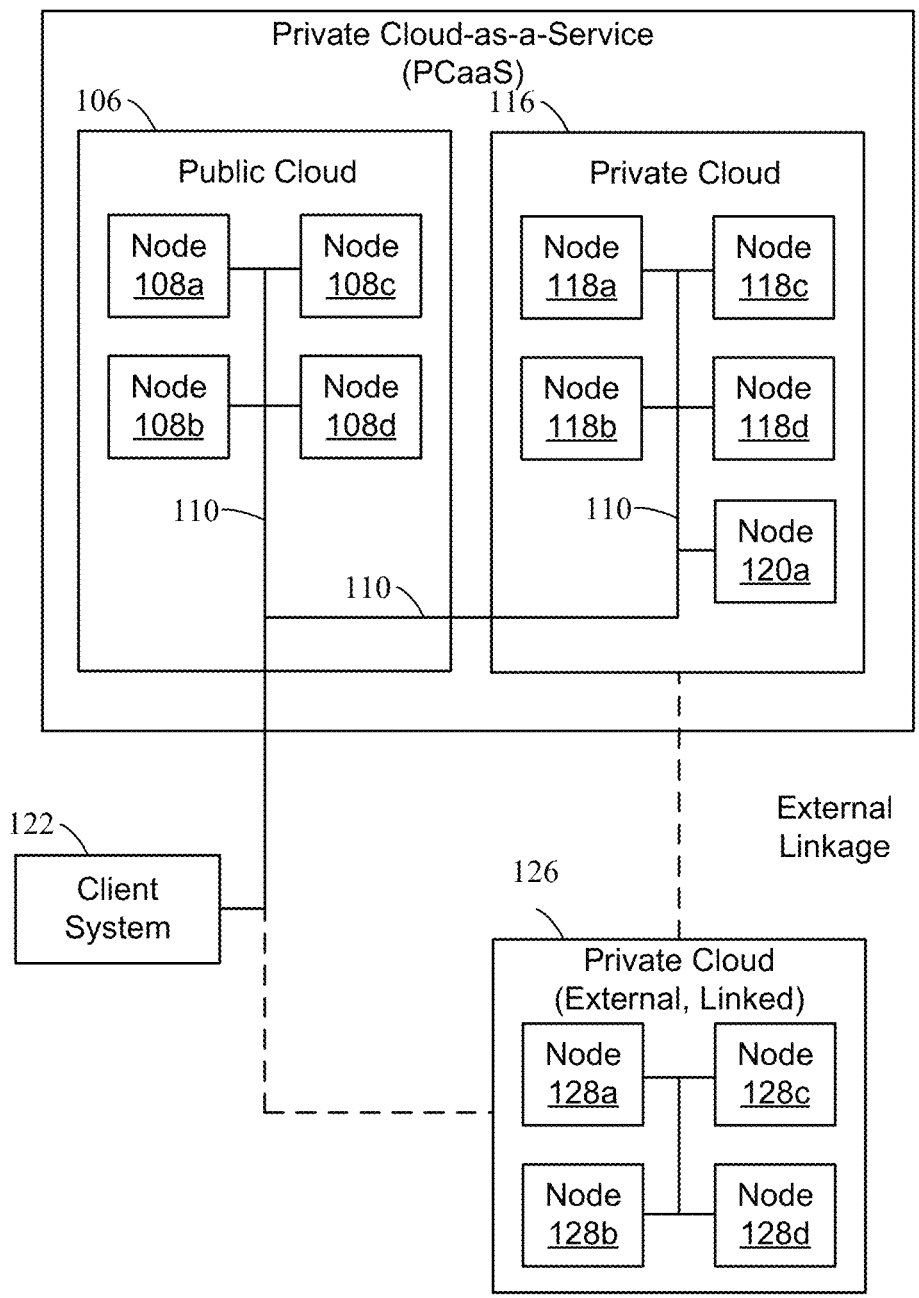
FIG. 1D illustrates an example architecture of PCaaS connected to an external private cloud.

FIG. 1A illustrates an example Private Cloud as a Service (PCaaS) computing environment 100. PCaaS 100 may include a public cloud 106, a private cloud 116, and a client system 122. Public cloud 106 may be hosted in one or more data centers 102. The PCaaS computing environment 100 may provide for sharing of resources, such as application and data, between the public cloud 106 and the private cloud 116. Private cloud 116 may also be hosted in one or more data centers 102, which may be the same or different as the data center(s) 102 in which public cloud 106 is hosted. Public cloud 106 may include server nodes 108a-d and may be, e.g., Microsoft Azure™ or the like. Private cloud 116 may include server nodes 118a-d and management server node 120a. The server nodes 108 of the public cloud 106 may be hosted in one or more data centers that are different from one or more data centers in which the server nodes 118 of the private cloud 116 are hosted. Alternatively, one or more server nodes 108 of the public cloud 106 may be hosted in the same data center as one or more server nodes 118 of the private cloud 116. Server nodes 108, 118, and 120 may be computer systems connected to each other by a network 110. Each of the server nodes 108, 118, 120 may have at least one processing unit, and may also have one or more storage devices, such as a disk drive, flash storage drive, or the like. Private cloud 116 may be, e.g., VMware Cloud™ or the like. Each of the server nodes 108, 118, 120 may execute a hypervisor such as the VMware ESXi™ hypervisor, the Microsoft Hyper-V™ hypervisor, or other suitable hypervisor. Each of the server nodes 108, 118 may use the hypervisor to execute virtual machines (VMs), operating systems, and software applications. Management node 120a in private cloud 116 may provide management services for the private cloud 116, e.g., resource management, VM management, VM deployment, task scheduling, statistics and logging, and server node management. Software that provides the management services may execute on management node 120a. The management services on management node 120a may be provided by the VMware vCenter Server® management platform, for example.

Although FIG. 1A illustrates a particular arrangement of server nodes in public cloud 106 and private cloud 116, this disclosure contemplates any suitable arrangement of server nodes in public cloud 106 and private cloud 116. This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

The network 110 may include one or more network links. In particular embodiments, one or more links of the network 110 may include one or more wireline (such as, for example, Digital Subscriber Line (DSL) or Data Over Cable Service Interface Specification (DOC SIS)), wireless (such as, for example, Wi-Fi or Worldwide Interoperability for Microwave Access (WiMAX)), or optical (such as, for example, Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links. The links need not necessarily be the same throughout PCaaS computing environment 100.

In particular embodiments, client system 122 may be an electronic device, including hardware, software, or embedded logic components or a combination of two or more such components and capable of carrying out the appropriate functionalities implemented or supported by client system 122. As an example and not by way of limitation, a client system 122 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 122 may enable a network user at client system 122 to access network 110. A client system 122 may enable its user to communicate with other users at other client systems 130.

FIG. 1B illustrates an example server node 118. The server node 118 may comprise a hypervisor 130. Hypervisor 130, e.g., VMware ESXi™ or the like, may create and manage one or more virtual machines, including 132a and 132b, on the server node 118. A virtual machine may execute an instance of an operating system (OS) and instances of one or more applications. Although two virtual machines 132a, 132b are shown, any suitable number of virtual machines 132 may be executed by hypervisor 130.

FIG. 1C illustrates an example management server node 120. Management server node 120 may comprise a management hypervisor 134. The management hypervisor 134, e.g., VMware ESXi™ or the like, may create and manage one or more virtual machines 132 for management components. The management components may execute in a VM 132 using the management hypervisor 134 on the management server node 120. As described above, management node 120 may provide management services for the private cloud 116, e.g., resource management, VM management, VM deployment, task scheduling, statistics and logging, and server node management. The management components may comprise VMware vCenter Server VMware ESXi™, PCS, and DNS software components.

FIG. 1D illustrates an example architecture of PCaaS connected to an external private cloud. In particular embodiments, the PCaaS computing environment 100 may have networking and management connectivity with one or more external private clouds 126 which are not hosted by the PCaaS provider. The external private cloud 126 may include server nodes 128a-128d. The configuration may be referred to as "Linked Mode". In Linked Mode, user accounts and credentials from external private cloud environments may be used to authenticate with the PCaaS private cloud, without requiring any explicit such accounts and credentials to be explicitly created in the PCaaS private cloud. Further, a singular interface served by management components on the external private cloud 126 and/or on the PCaaS private cloud 116 may be used to manage the external private cloud 126 as well as PCaaS private cloud 116. An external private cloud 126 may comprise a private cloud running in a customer-controlled environment, a PCaaS private cloud in the same location, or at another location, or a private cloud running in a manager provider-controlled environment, created and operated exclusively for a single consumer organization.

Figure 2:
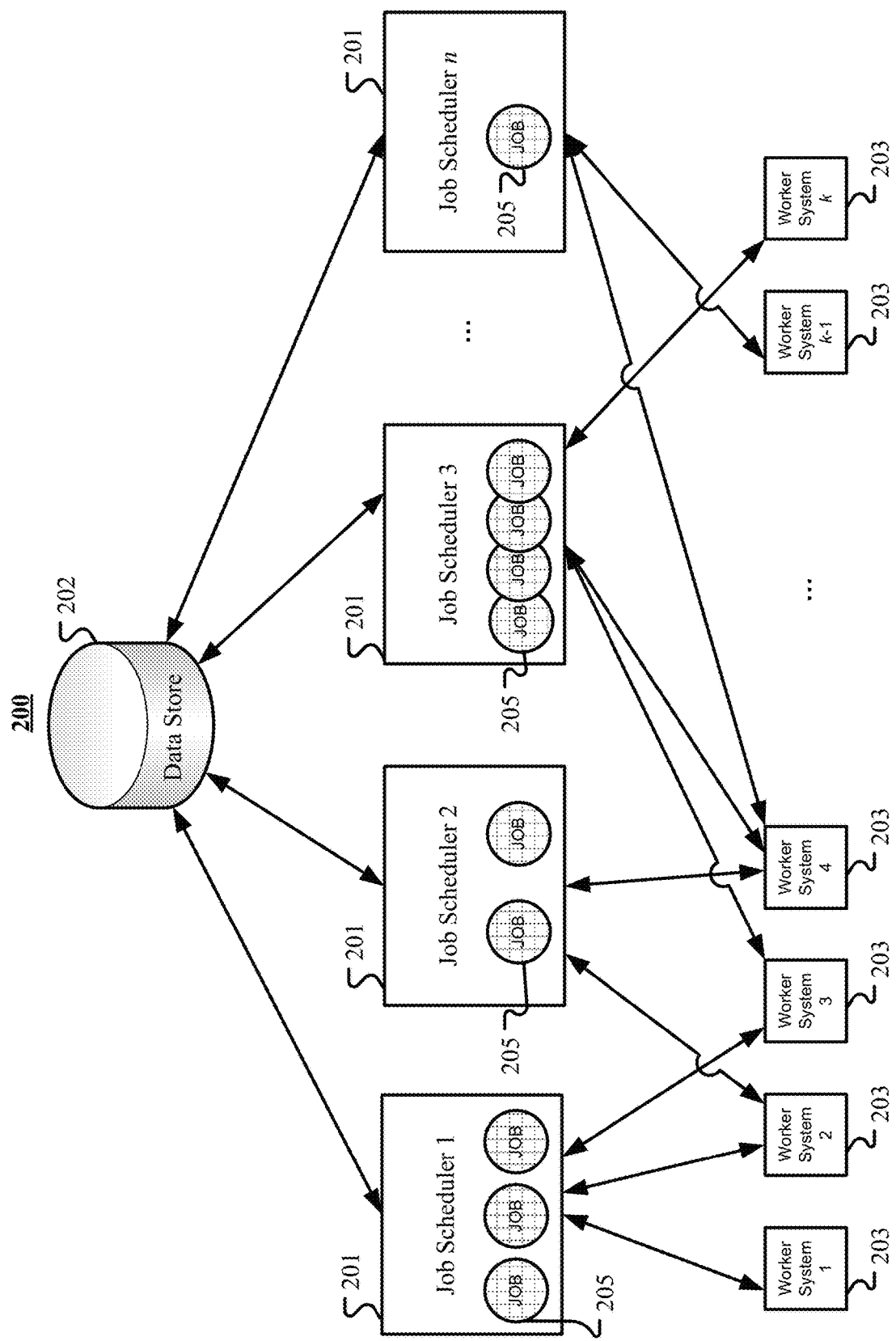
FIG. 2 illustrates an example architecture for a distributed job scheduling system.

FIG. 2 illustrates an example architecture for a distributed job scheduling system 200. Each of a plurality of job schedulers 201 may handle one or more jobs 205. A job 205 may comprise one or more steps. Each step may be an atomic unit of a job that can be performed by a worker system 203 independently of the other steps as long as a set of required conditions for the step are met. If any of the set of required conditions for a step B is fulfilled by completing another step A, the corresponding job scheduler 201 may attempt to complete the step A before initiating the step B. If the sets of required conditions for two steps, step A and step B, do not depend on completions of each other, the corresponding job scheduler 201 may attempt to complete the step A and step B in parallel. Information associated with the distributed job scheduling system, including workloads for the job schedulers, a list of jobs, information associated with each job including a job identifier, an assigned job scheduler, a schedule, a type of the job, a list of steps, and details of each of the one or more steps, may be stored in a data store 202. The data store 202 may be duplicated to make the distributed job scheduling system 200 a fail-safe system. In the example illustrated in FIG. 2, the job scheduler 1 is maintaining three jobs, the job scheduler 2 is maintaining two jobs, the job scheduler 3 is maintaining four jobs and the job scheduler n is maintaining one job. Each job scheduler 201 may communicate with the data store 202 either to retrieve information from the data store 202 or to store information to the data store 202. The job scheduler 201 may send commands to a corresponding worker system 203 to initiate a step. After performing the step initiated by the commands, the worker system 203 may send a status update to the job scheduler, where the status update may comprise results of performing the step. The job scheduler 201 may store the received status update to the data store 202. The job schedulers 201 in this distributed job scheduling system 200 may be lightweight because the job scheduler 201 does not need to run tasks in any of the steps. When a job scheduler 201 crashes, another job scheduler 201 may be able to take over the jobs that were managed by the crashed job scheduler 201 even without re-initiating any step. When a worker system 203 crashes, the job scheduler 201 may need to send the commands for the pending steps that were initiated on the crashed worker system 203 to another worker system 203 that is capable of handling the pending steps. In particular embodiments, the worker system 203 may acknowledge a successful completion of a step it was called to execute, by calling back the distributed job scheduler service. In this callback, the worker system 203 may communicate properties that may need to be added or changed in the scope of this job. Upon receiving such callback, the distributed job scheduler 201 will persist the state of the job. Although this disclosure describes an architecture of the distributed job scheduling system in a particular manner, this disclosure contemplates the architecture of the distributed job scheduling system in any suitable manner.

In particular embodiments, a job scheduler 201 associated with a distributed job scheduling system 200 may receive a request to perform a job from a client computing device. The client computing device may be any computing device that needs to schedule a job, e.g., a resource integration manager or a private cloud provisioning manager of a PCaaS management system. The job may comprise one or more steps to be completed in a period. The request may comprise a job description for the job comprising a name of the job, a frequency to perform the job, a schedule to perform the job, a timeout, and a step description for each of the one or more steps.

FIG. 3A illustrates an example job description. The name field may uniquely identify the job within the distributed job scheduling system 200. The description field may provide a brief description of the job. The frequency field may be either "OneTime" or "Periodic." The schedule field may specify a time instance at which the job is to be initiated if the frequency is "OneTime." The schedule filed may indicate periodic schedule using the cron schedule format if the frequency is "Periodic." For example, a schedule field value */5**** may indicate that the job needs to be executed in every 5 minutes. The job scheduler 201 may initiate the job immediately on receiving a job description illustrated in FIG. 3A because the frequency is "OneTime," and the schedule is not specified in the example. If the frequency is "OneTime," and the schedule is specified, the job scheduler 201 may initiate the job at the time specified by the schedule. If the frequency is "Periodic," the schedule may indicate an interval between activations of consecutive job instances. The timeout may indicate a default timeout value for any step execution in the job. If a step description specifies a timeout value, the step timeout may override the default timeout. The job description 301 may include one or more step descriptions under the steps field. Although this disclosure describes receiving a request to perform a job from a client computing device in a particular manner, this disclosure contemplates receiving a request to perform a job from a client computing device in any suitable manner.

In particular embodiments, the distributed job scheduling system may comprise one or more job schedulers 201. In the example illustrated in FIG. 2, the distributed job scheduling system 200 comprises n job schedulers 201. Each of the one or more job schedulers 201 in the distributed job scheduling system may manage one or more jobs 205. A first job scheduler 201 may be a leader job scheduler among the one or more job schedulers 201. The leader job scheduler 201 may receive the request to perform a job 205 from a client computing device. The leader job scheduler 201 may assign the received request to one of the one or more job schedulers 201. In particular embodiments, the leader job scheduler 201 may assign the received request to a randomly selected job scheduler 201. In particular embodiments, the leader job scheduler 201 may assign the received request to one of the one or more job schedulers 201 in a round robin manner. In particular embodiments, the leader job scheduler 201 may assign the received request to one of the one or more job schedulers 201 based on current workload of each of the one or more job schedulers 201. The leader job scheduler may determine workload of each of the one or more job schedulers 201 by sending a query to the data store 201 regarding the current workload of each of the one or more job schedulers 201. In particular embodiments, the leader job scheduler may assign the received request to one of the one or more job schedulers 201 in any other suitable manner. To assign the received request to one of the one or more job scheduler 201, the leader job scheduler 201 may forward the received request to the one of the one or more job schedulers 201. As an example and not by way of limitation, the leader job scheduler 201 may receive a request to perform a job from a client computing device. The leader job scheduler 201 may randomly select one of the active job schedulers in the distributed job scheduling system 200 and forward the received request to the selected job scheduler. Although this disclosure describes functionalities of the leader job scheduler in a particular manner, this disclosure contemplates functionalities of the leader job scheduler in any suitable manner.

In particular embodiments, the data store 202 may elect a leader job scheduler when no active leader device exists. The data store 202 may have information regarding currently active job schedulers 201 and their respective workloads. The data store 202 may elect a new leader job scheduler based on information available on the data store 202. The condition that no active leader job scheduler exists may occur when a previous leader job scheduler crashes. In particular embodiments, the condition that no active leader job scheduler exists may occur when the distributed job scheduling system is initiated. In particular embodiments, the condition that no active leader job scheduler exists may occur when any suitable event causing the leader job scheduler to no longer be able to act as the leader job scheduler happens. As an example and not by way of limitation, the leader job scheduler 201 may crash for a particular reason. On detecting the crash of the current leader job scheduler based on a periodic health check or based on any suitable detection algorithms, the data store 202 may elect another active job scheduler as the new leader job scheduler and send a message to the elected leader job scheduler to inform the election. On receiving the message from the data store 202, the elected job scheduler 201 may act as the leader job scheduler. Although this disclosure describes election of the leader job scheduler in a particular manner, this disclosure contemplates election of the leader job scheduler in any suitable manner.

In particular embodiments, on receiving the request to perform a job, the job scheduler 201 responsible for the job may store the job description into the data store 202. The job scheduler 201 may create a handler for the received request. The handler may be a process within the job scheduler 201 that is responsible for performing the job throughout a lifetime of the job. In particular embodiments, the handler may be a thread within the job scheduler 201 that is responsible for performing the job throughout the lifetime of the job. If the job is supposed to be performed at a particular time instance, the corresponding handler may wait until the particular time instance. The job scheduler 201 may initiate an execution of the job at the time instance indicated by the schedule if the frequency is once. The job scheduler 201 may initiate executions of the job at an interval indicated by the schedule if the frequency is periodic. As an example and not by way of limitation, illustrated in FIG. 3A, the job "private-cloud-provisioning" is supposed to be performed once and supposed to be initiated immediately. The job scheduler 201 responsible for the job "private-cloud-provisioning" may store the received job description to the data store 202. The job scheduler 201 may create a handler thread responsible for the job. Because the job is supposed to be performed immediately, the handler may initiate executions of the job immediately. Although this disclosure describes receiving a request to perform a job and initiating executions of the job in a particular manner, this disclosure contemplates receiving the request to perform the job and initiating executions of the job in any suitable manner.

FIG. 3B illustrates an example step description. In particular embodiments, the job scheduler 201 may retrieve a step description corresponding to one of the one or more steps of the job to be performed from the data store. The step description 302 may comprise a name of the step, a communication endpoint for a corresponding worker system 203, and commands to be delivered to the worker system 203. The communication endpoint may comprise an address and a port number. The commands may comprise Uniform Resource Identifier (URI) for a Representational State Transfer (REST) request. The step description 302 may also optionally comprise a description of the step, a timeout value for the step, a retry count and a sleep duration between executions of the step. The retry count may indicate a number of retries that the job scheduler 201 needs to try to perform the step when tries are not successful before the job scheduler 201 finally determines that triggering the step to be performed is failed. As an example and not by way of limitation, illustrated in FIG. 3B, the job scheduler 201 may retrieve a step description 302 for "hosts connectivity data" from the data store 202. The address for the corresponding worker system 203 is "resource-init-manager" and the port number for the corresponding worker system 203 is 80. The address for the corresponding worker system 203 may be resolve into an Internet Protocol (IP) address by querying a Domain Name Server (DNS). The step timeout is 60 seconds. Thus, the job scheduler 201 may treat a try as a failure if the job scheduler 201 does not receive a response from the worker system 203 in 60 seconds after sending the commands to the worker system 203. The retry count is 0. Thus the job scheduler 201 may not retry if a first try to initiate the step fails. Although this disclosure describes retrieving a step description in a particular manner, this disclosure contemplates retrieving a step description in any suitable manner.

The job scheduler 201 may send the commands to the communication endpoint for the corresponding worker system 203. A worker system 203 may be agnostic to another worker system 203. The corresponding worker system 203 may perform the step on receiving the commands from the job scheduler 201, where the details of the step may be specified in the commands. After finishing the step, the corresponding worker 201 system may send a status update comprising results for the commands. The job scheduler 201 may receive a status update comprising results for the commands from the corresponding worker system 203. If the job scheduler 201 does not receive the status update within the timeout, the job scheduler 201 may consider that the attempt has failed. The job scheduler 201 may store the status update to the data store 201. In particular embodiments, a step may comprise a plurality of iterations. In such cases, the results of the commands may not be terminal state results if the worker system 203 performed a non-terminal iteration of the step. On receiving non-terminal state results, the job scheduler 201 may store the received non-terminal state results to the data store 202, sleep for an amount of time indicated in the step description and send the commands with an increased iteration number to the communication endpoint for the corresponding worker system 203. For a step comprising a plurality of iterations, the worker system 203 may identify one or more tasks to be done in each iteration of the step by sending a query to a second data store. In particular embodiments, the worker system 203 may identify one or more tasks to be done in each iteration of the step based on configurations. As an example and not by way of limitation, the job scheduler 201 may send the commands to a worker system 203 after retrieving a step description illustrated in FIG. 3B from the data store 202. The communication endpoint for the worker system 203 is resource-init-manager:80. The commands to be delivered to the worker system 203 is "/api/v1/provision/djs-job-step/hosts-connectivity-data." The REST API the job scheduler 201 may use to send the commands to the worker system 203 may be:

POST http://resource-init-manager:80/api/v1/provision/djs-job-step/hosts-connectivity-data.

If the step comprises a plurality of iterations, the worker system 203 may return a status update with non-terminal state results (e.g., iterationSucceeded). On receiving a status update with the non-terminal state results, the job scheduler 201 may store the received status update to the data store 202, sleep for 10 seconds as specified in the step description and send commands for the next iteration. The REST API to send the commands for the second iteration may be:

POST http://resource-init-manager: 80/api/v1/provision/djs-job-step/hosts-connectivity-data?iteration=2

On finishing the required number of iterations, the worker system 203 may send a status report with a terminal state result (e.g., succeeded). On receiving the status report with the terminal state result, the job scheduler 201 may store the status report to the data store 202 and move to the next step by retrieving the next step description from the data store 202. Although this disclosure describes causing a step to be performed by a worker system in a particular manner, this disclosure contemplates causing a step to be performed by a worker system in any suitable manner.

Figure 4:
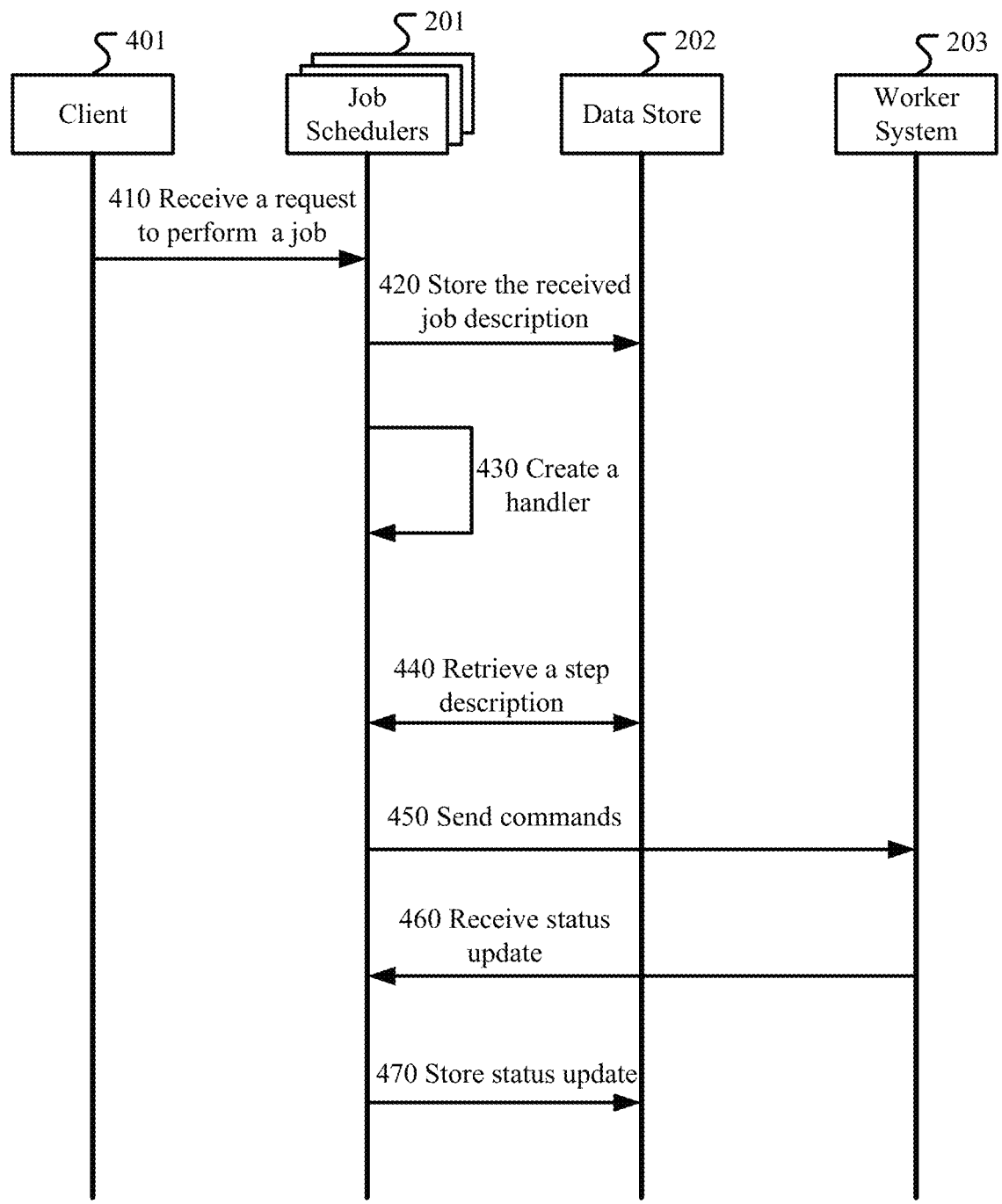
FIG. 4 illustrates an example sequence for a distributed job scheduling system to process a request to perform a job.

FIG. 4 illustrates an example sequence for a distributed job scheduling system to process a request to perform a job. At step 410, the leader job scheduler 201 may receive a request to perform a job from a client computing device 401. The leader job scheduler 201 may select one of the active job schedulers as a responsible job scheduler for the job 205 and forward the received request to the selected job scheduler 201 though this step is not depicted in FIG. 4. At step 420, the responsible job scheduler 201 may store the received job description 301 to the data store 202. At step 430, the responsible job scheduler 201 may create a handler for the job 205. At step 440, the responsible job scheduler 201 may retrieve a step description 302 from the data store 202. At step 450, the responsible job scheduler 201 may send commands to a corresponding worker system 203. At step 460, the responsible job scheduler 201 may receive status update with a state result from the corresponding worker system 203. The status update may comprise properties that may need to be added or changed in the scope of this job. At step 470, the responsible job scheduler 201 may store the received status update to the data store 202. The job scheduler 201 may repeat from step 440 through step 470 for each step in the job description 301.

The leader job scheduler 201 may receive a request to terminate a job 205 that is to be performed in the future from the client computing device 401. The leader job scheduler 201 may determine which of the one or more job schedulers 201 in the distributed job scheduling system 200 is managing the job 205 to be terminated by sending a query to the data store 202 regarding a job scheduler 201 that is currently managing the job 205 to be terminated. In particular embodiments, the leader job scheduler 201 may determine which of the one or more job schedulers is managing the job 205 to be terminated based on local records. The leader job scheduler 201 may forward the request to terminate the job 205 to the determined job scheduler. The job scheduler 201 managing the job 205 to be terminated may send a request to delete the job 205 to the data store 202. On receiving the request to delete the job 205, the data store 202 may delete the job description for the job and stored status information. The job scheduler 201 may eliminate all the local data associated with the job 205. The job scheduler 201 may terminate the handler for the job 205. Although this disclosure describes terminating a job that is to be performed in the future in a particular manner, this disclosure contemplates terminating a job that is to be performed in the future in any suitable manner.

Figure 5:
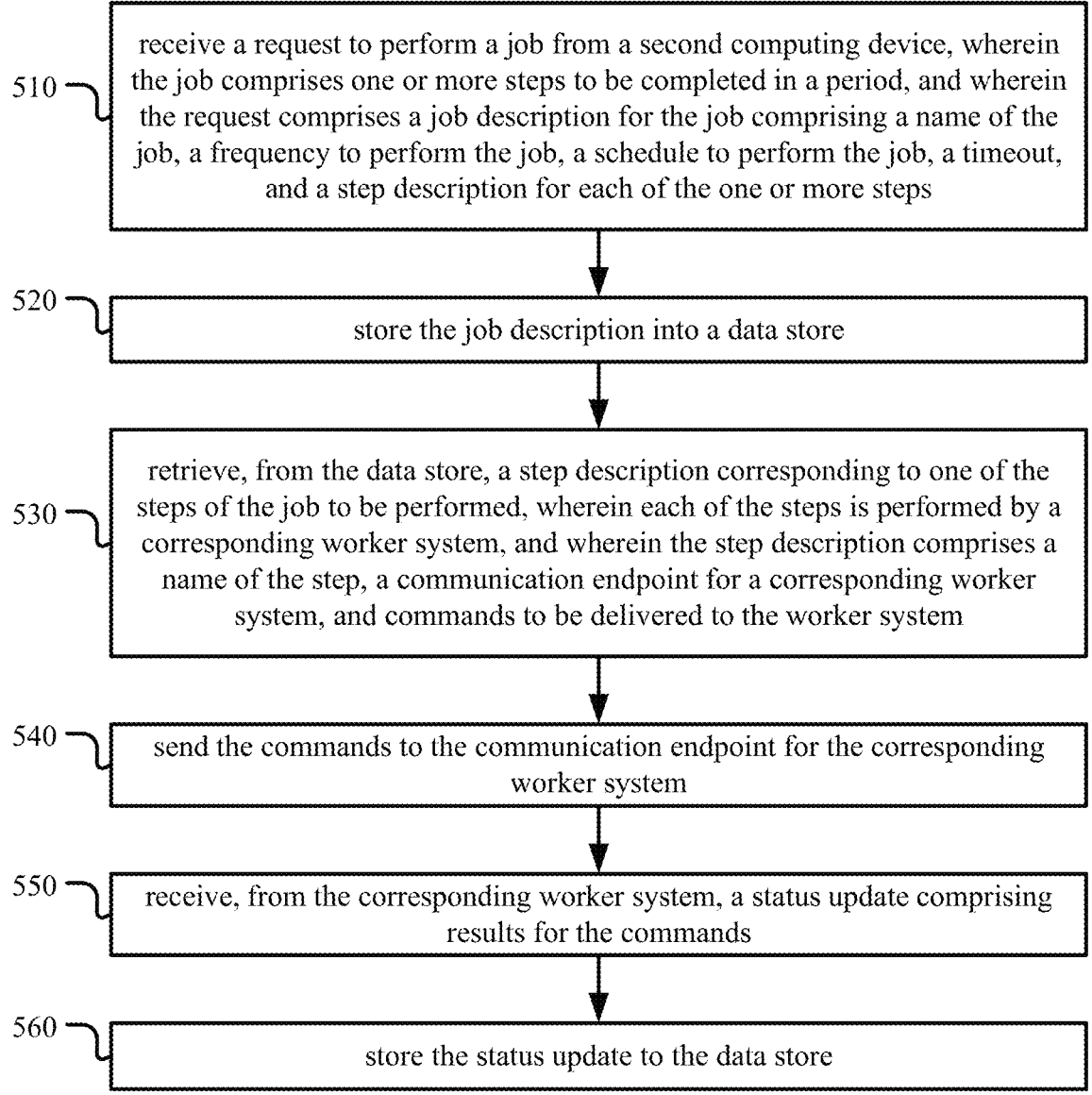
FIG. 5 illustrates an example method for triggering a job to be performed in a distributed job scheduling system.

FIG. 5 illustrates an example method 500 for triggering a job to be performed in a distributed job scheduling system. The method may begin at step 510, where the job scheduler 201 may receive a request to perform a job from a second computing device, wherein the job comprises one or more steps to be completed in a period, and wherein the request comprises a job description for the job comprising a name of the job, a frequency to perform the job, a schedule to perform the job, a timeout, and a step description for each of the one or more steps. At step 520, the job scheduler 201 may store the job description into a data store. At step 530, the job scheduler 201 may retrieve, from the data store, a step description corresponding to one of the steps of the job to be performed, wherein each of the steps is performed by a corresponding worker system, and wherein the step description comprises a name of the step, a communication endpoint for a corresponding worker system, and commands to be delivered to the worker system. At step 540, the job scheduler 201 may send the commands to the communication endpoint for the corresponding worker system. At step 550, the job scheduler 201 may receive, from the corresponding worker system, a status update comprising results for the commands. At step 560, the job scheduler 201 may store the status update to the data store. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for triggering a job to be performed in a distributed job scheduling system including the particular steps of the method of FIG. 5, this disclosure contemplates any suitable method for triggering a job to be performed in a distributed job scheduling system including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
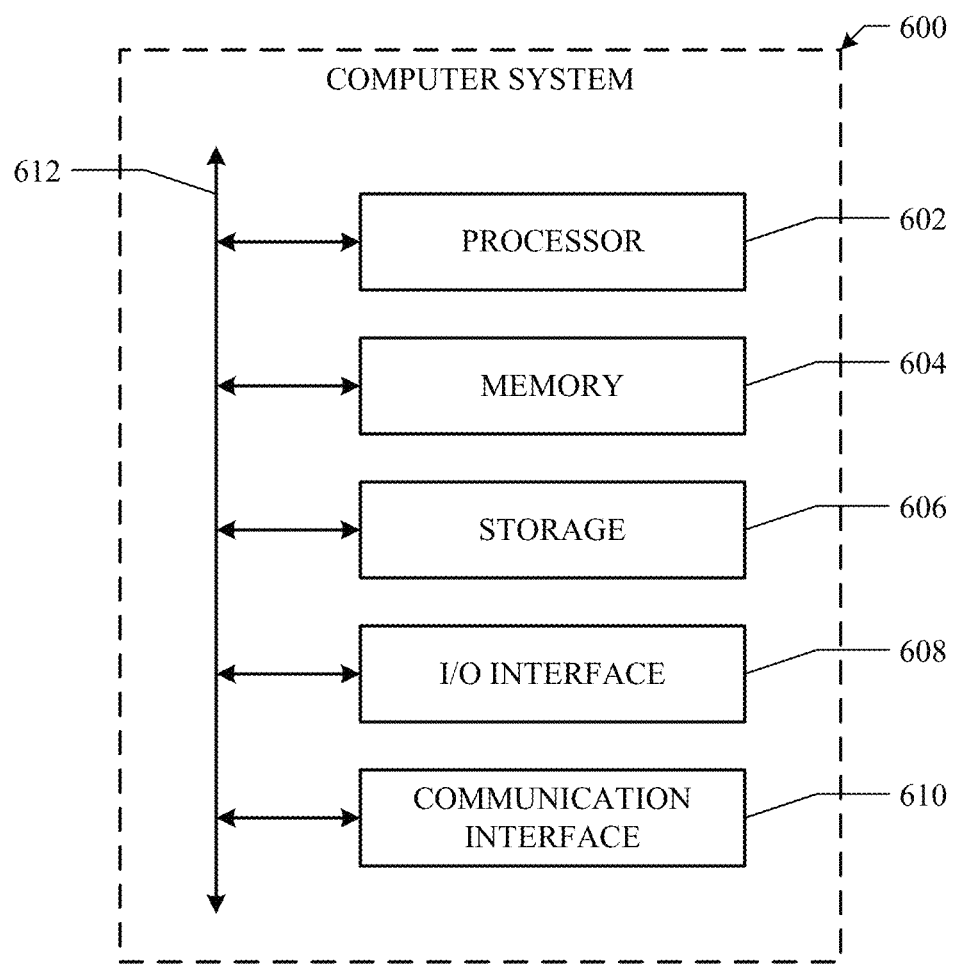
FIG. 6 illustrates an example computer system.
Like reference symbols in the various drawings indicate like elements.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFIMBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method when executed on data processing hardware of a job scheduler that causes the job scheduler to perform operations comprising:
   receiving a request to perform a job comprising one or more steps;
   initiating performance of one step from the one or more steps of the job by a first worker system of a plurality of distributed worker systems, the plurality of distributed worker systems executing on respective different compute nodes of a plurality of compute nodes of a distributed computing system, the first worker system executing on a first compute node of the plurality of distributed compute nodes;
   receiving, from the first worker system of the plurality of distributed worker systems, a status update comprising results of performing the one step from the one or more steps of the job;
   storing the status update to a shared data store shared among each worker system of the plurality of distributed worker systems;
   determining, based on the status update, that the one step from the one or more steps of the job failed; and
   in response to determining that the one step from the one or more steps of the job failed, initiating performance of the one step from the one or more steps of the job by a second worker system of the plurality of distributed worker systems using the status update stored at the shared data store, the second worker system executing on a second compute node of the plurality of distributed compute nodes, the second compute node different from the first compute node.

2. The computer-implemented method of claim 1, wherein the operations further comprise creating a handler for the request, wherein the handler is a process that is responsible for performing the job throughout a lifetime of the job.

3. The computer-implemented method of claim 1, wherein the operations further comprise assigning the one step from the one or more steps of the job to the first worker system of the plurality of distributed worker systems.

4. The computer-implemented method of claim 3, wherein assigning the one step from the one or more steps of the job to the first worker system of the plurality of distributed worker systems comprises:
   determining a load of each worker system of the plurality of distributed worker systems;
   selecting the first worker system of the plurality of distributed worker systems based at least on the determined load; and
   forwarding the one step from the one or more steps of the job to the first worker system of the plurality of distributed worker systems.

5. The computer-implemented method of claim 1, wherein the operations further comprise receiving a termination request to terminate the job.

6. The computer-implemented method of claim 1, wherein at least one step comprises a plurality of iterations.

7. The computer-implemented method of claim 6, wherein the first worker system of the plurality of distributed worker systems identifies one or more tasks to be done in each iteration of the at least one step by querying a shared data store.

8. The computer-implemented method of claim 1, wherein the request further comprises at least one of:
   a job description;
   a name of the job;
   a schedule to perform the job;
   a step description for each step of the one or more steps; or
   a timeout period.

9. The computer-implemented method of claim 1, wherein each step of the one or more steps of the job performs sequentially.

10. The computer-implemented method of claim 1, in response to determining that the one step from the one or more steps of the job failed, re-initiating performance of the one step from the one or more steps of the job by the first worker system of the plurality of distributed worker systems.

11. A job scheduler comprising
   data processing hardware; and
   memory hardware in communication with the data processing hardware and storing instructions that, when executed by the data processing hardware, cause the data processing hardware to perform operations comprising:
      receiving a request to perform a job comprising one or more steps;
      initiating performance of one step from the one or more steps of the job by a first worker system of a plurality of distributed worker systems, the plurality of distributed worker systems executing on respective different compute nodes of a plurality of compute nodes of a distributed computing system, the first worker system executing on a first compute node of the plurality of distributed compute nodes;
      receiving, from the first worker system of the plurality of distributed worker systems, a status update comprising results of performing the one step from the one or more steps of the job;
      storing the status update to a shared data store shared among each worker system of the plurality of distributed worker systems;
      determining, based on the status update, that the one step from the one or more steps of the job failed; and
      in response to determining that the one step from the one or more steps of the job failed, initiating performance of the one step from the one or more steps of the job by a second worker system of the plurality of distributed worker systems using the status update stored at the shared data store, the second worker system executing on a second compute node of the plurality of distributed compute nodes, the second compute node different from the first compute node.

12. The job scheduler of claim 11, wherein the operations further comprise creating a handler for the request, wherein the handler is a process that is responsible for performing the job throughout a lifetime of the job.

13. The job scheduler of claim 11, wherein the operations further comprise assigning the one step from the one or more steps of the job to the first worker system of the plurality of distributed worker systems.

14. The job scheduler of claim 13, wherein assigning the one step from the one or more steps of the job to the first worker system of the plurality of distributed worker systems comprises:
   determining a load of each worker system of the plurality of distributed worker systems;
   selecting the first worker system of the plurality of distributed worker systems based at least on the determined load; and
   forwarding the one step from the one or more steps of the job to the first worker system of the plurality of distributed worker systems.

15. The job scheduler of claim 11, wherein the operations further comprise receiving a termination request to terminate the job.

16. The job scheduler of claim 11, wherein at least one step comprises a plurality of iterations.

17. The job scheduler of claim 16, wherein the first worker system of the plurality of distributed worker systems identifies one or more tasks to be done in each iteration of the at least one step by querying a shared data store.

18. The job scheduler of claim 11, wherein the request further comprises at least one of:
   a job description;
   a name of the job;
   a schedule to perform the job;
   a step description for each step of the one or more steps; or
   a timeout period.

19. The job scheduler of claim 11, wherein each step of the one or more steps of the job performs sequentially.

20. The job scheduler of claim 11, in response to determining that the one step from the one or more steps of the job failed, re-initiating performance of the one step from the one or more steps of the job by the first worker system of the plurality of distributed worker systems.

* * * * *